United States Patent [19]

Takahashi

[11] Patent Number: 5,481,702
[45] Date of Patent: Jan. 2, 1996

[54] ALLOCATION OPTIMIZATION WITH DIFFERENT BLOCK-SIZED ALLOCATION MAPS

[75] Inventor: Kikuo Takahashi, Hachioji, Japan

[73] Assignee: Hitachi, Ltd., Tokyo, Japan

[21] Appl. No.: 925,654

[22] Filed: Aug. 7, 1992

[30] Foreign Application Priority Data

Aug. 8, 1991 [JP] Japan .................................. 3-199085

[51] Int. Cl.⁶ .......................... G06F 12/02; G06F 17/30
[52] U.S. Cl. ................... 395/600; 395/438; 395/497.02; 395/497.03; 364/254.3; 364/282.2; 364/957.1; 364/256.4; 364/DIG. 1
[58] Field of Search ........................ 395/600, 400, 395/650, 325, 425, 438, 497.02, 497.03, 497.04

[56] References Cited

U.S. PATENT DOCUMENTS

| | | | |
|---|---|---|---|
| 4,536,837 | 8/1985 | Olson et al. | 395/600 |
| 4,903,234 | 2/1990 | Sakurasa et al. | 365/49 |
| 4,908,789 | 3/1990 | Blokkum et al. | 395/425 |
| 4,992,935 | 2/1991 | Comerford et al. | 395/425 |
| 5,058,003 | 10/1991 | White | 395/400 |
| 5,129,070 | 7/1992 | Durotte | 395/400 |
| 5,129,088 | 7/1992 | Auslander et al. | 395/400 |
| 5,339,411 | 8/1994 | Heaton | 395/600 |
| 5,375,233 | 12/1994 | Kimber et al. | 395/600 |

OTHER PUBLICATIONS

JP-A-Hei 3-92 941, Sakaf, 18 Apr. 1991 Abstract Only.
JP-A-Sho 59-173865, Yoshida, 2 Oct. 1984, Abstract Only.

*Primary Examiner*—Thomas G. Black
*Assistant Examiner*—Paul R. Lintz
*Attorney, Agent, or Firm*—Antonelli, Terry, Stout & Kraus

[57] ABSTRACT

A method of seeking a vacant memory area uses area management tables having 1 MB and 4 kB unit area sizes for controlling the vacancy/occupancy status of each unit area of a file allocation space in a disk memory, and a free area seek program which seeks a vacant area of a requested size by selectively using the tables depending on the requested size. The program first seeks a vacant area based on the table of larger unit area size to thereby determine the major part the area required and then seeks a vacant area based on the table of smaller unit area size for determining the rest of the area required.

13 Claims, 6 Drawing Sheets

FIG. 4

300 AREA MANAGEMENT TABLE OF 1 MB UNIT AREA SIZE

| 11111111 | 00100001 |
|---|---|
| BYTE 0 | BYTE 1 |

FIG. 5

400 AREA MANAGEMENT TABLE OF 4 KB UNIT AREA SIZE

THE BIT LOCATION OF TABLE 300

| | | | | |
|---|---|---|---|---|
| 0 | 11111111 / BYTE 0 | 11111111 / BYTE 1 | | 11111111 / BYTE 31 |
| 1 | 11000000 / BYTE 32 | 00001111 / BYTE 33 | | 11111111 / BYTE 63 |
| ... | | | | |
| 7 | 11111111 / BYTE 224 | 11111111 / BYTE 225 | | 11111110 / BYTE 255 |
| 8 | 00000000 / BYTE 256 | 00000000 / BYTE 257 | 00000···0 | 00000000 / BYTE 287 |
| 9 | 00000000 / BYTE 288 | 00000000 / BYTE 289 | 00000···0 | 00000000 / BYTE 319 |
| 10 | 01111111 / BYTE 320 | 11111111 / BYTE 321 | | 11111110 / BYTE 351 |
| ... | | | | BYTE 511 |

THESE BYTES CORRESPOND TO BYTE 0 IN TABLE 300

THESE BYTES CORRESPOND TO BYTE 1 IN TABLE 300

5,481,702

1

ALLOCATION OPTIMIZATION WITH DIFFERENT BLOCK-SIZED ALLOCATION MAPS

BACKGROUND OF THE INVENTION

This invention relates to the management of the memory space of a storage device in a computer system, and particularly to a method of seeking vacant (free) memory areas for the allocation of files of various sizes in a large-capacity disk memory.

A conventional technique for the management of memory space of the main memory which is a storage device is described in JP-A-Hei3-92941. Another conventional technique for the assignment of memory space on a magnetic disk (DASD) which is one of storage devices is described in JP-A-Sho59-173865.

According to this last mentioned prior art, the memory space of the storage device is partitioned into unit blocks of a single size, with each block being represented by one-bit data on a bit map so that the bit value reflects the vacant or occupied state of each unit block, and the management of memory space is implemented for each block based on its bit value on the bit map.

The above-mentioned JP-A-Sho59-173865 describes the overhead problem associated with counting the number of consecutive bits in seeking a continuous free area based on the bit map, and it offers a method of byte-wise (8 bits) seek using two kinds of conversion tables for the bit map to thereby dissolve the overhead problem. However, this method merely improves the seek efficiency by eight fold at most, and the efficiency will decrease as the DASD capacity continues to increase.

The prior art of the above-mentioned JP-A-Hei 3-92941 uses several bit maps for dealing with unit memory areas of different sizes, and seeks a single free unit memory area of one of the sizes demanded by selectively using a bit map for a unit area size equal to the required size. In this case, it is presumed that the required area size must be equal to one of the different sizes. This prior art cannot be applied when the demanded size is different from any of the provided sizes.

SUMMARY OF THE INVENTION

An object of this invention is to provide a method of seeking a free memory area which does not have the foregoing prior art deficiencies.

In order to achieve the above objective, the inventive method is designed as follows.

(1) Several kinds of area management tables are used;
(2) Each area management table has a different unit area size. For example, the area management tables include a bit map which is similar in area size per bit to the conventional bit map and bit maps of different area sizes per bit provided for the same physical memory space; and
(3) These area management tables are used either selectively or collectively for seeking a free memory area, depending on the size required.

2

Figure 3:
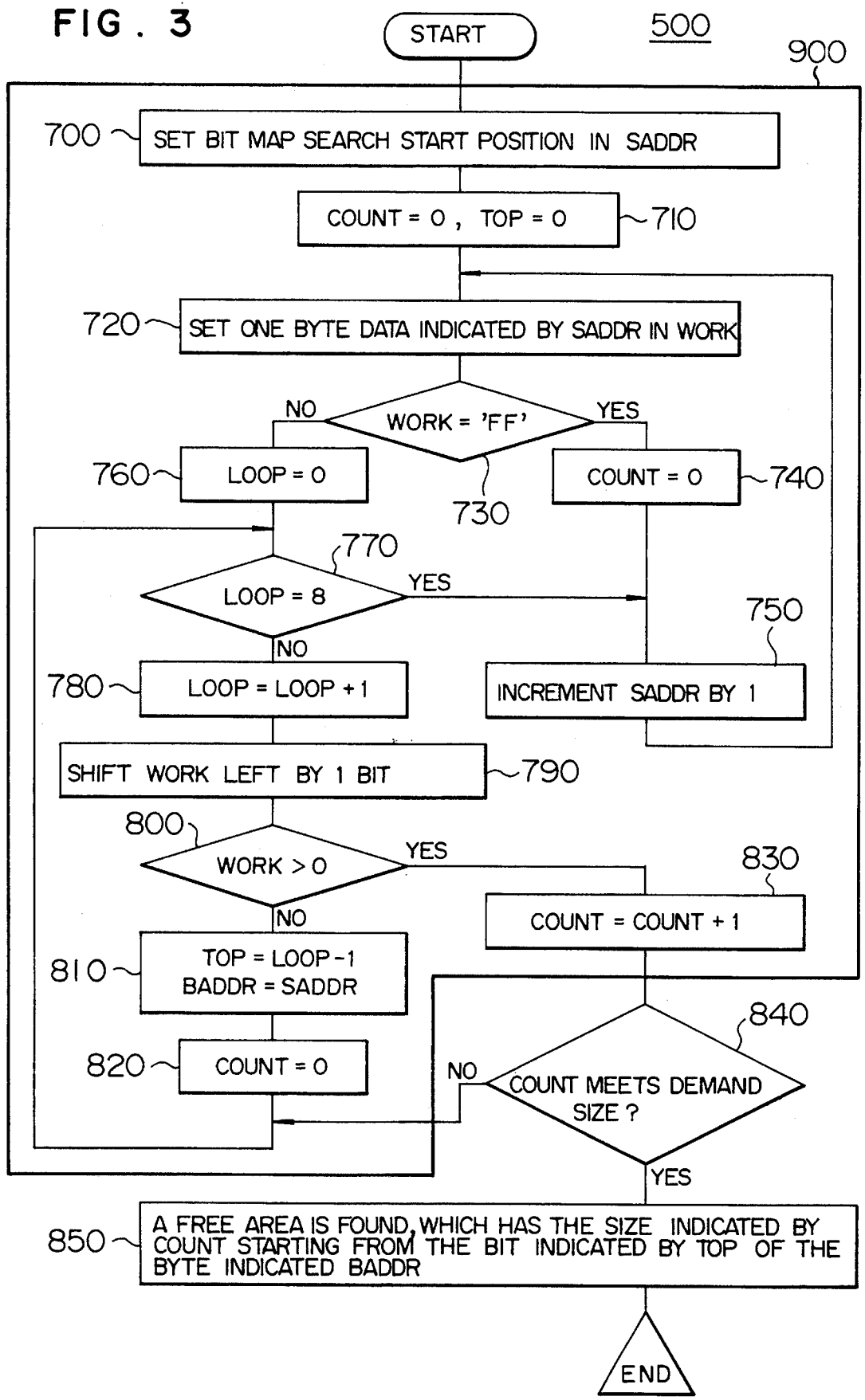
Figure 6:
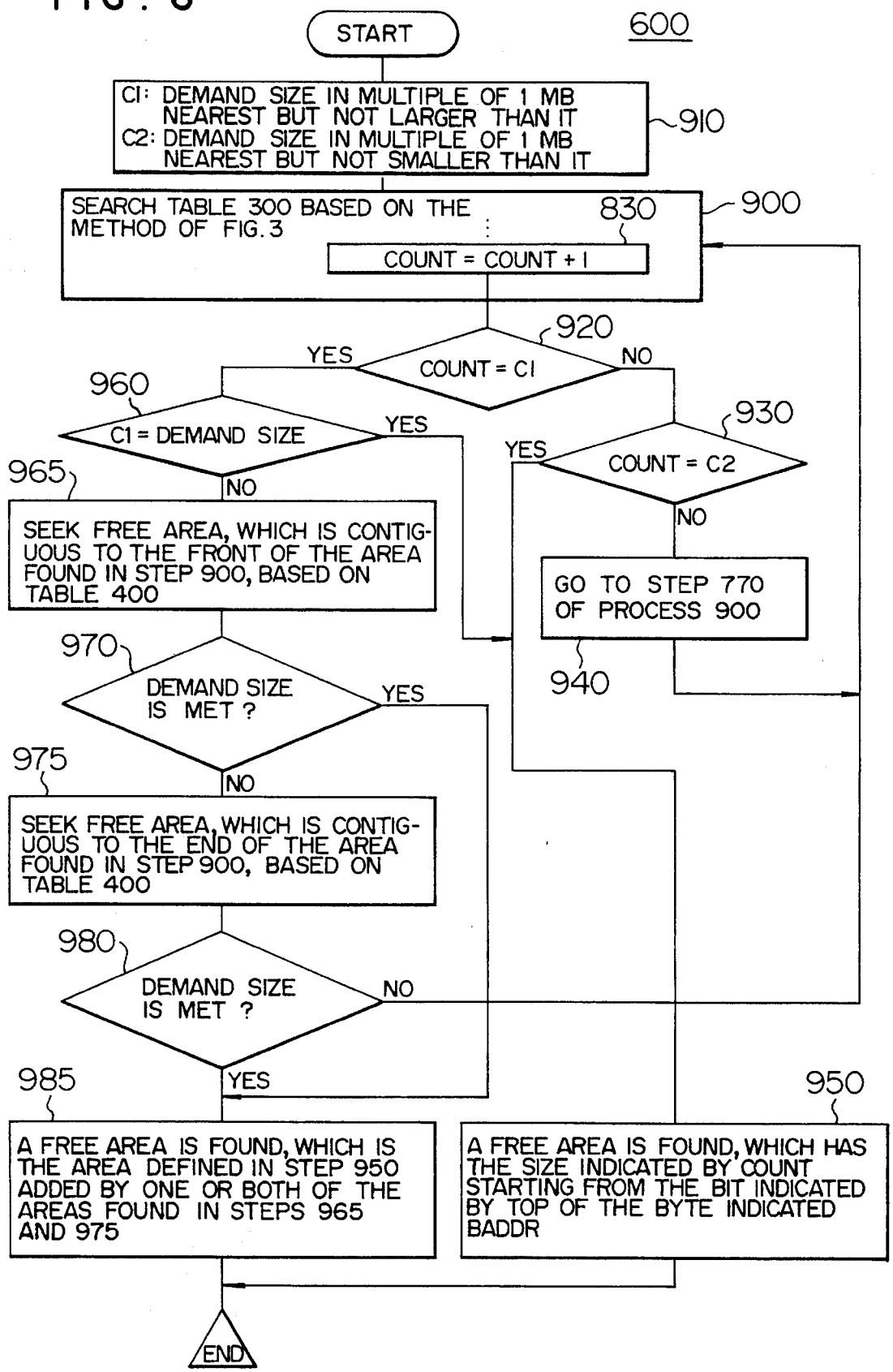
Figure 7:
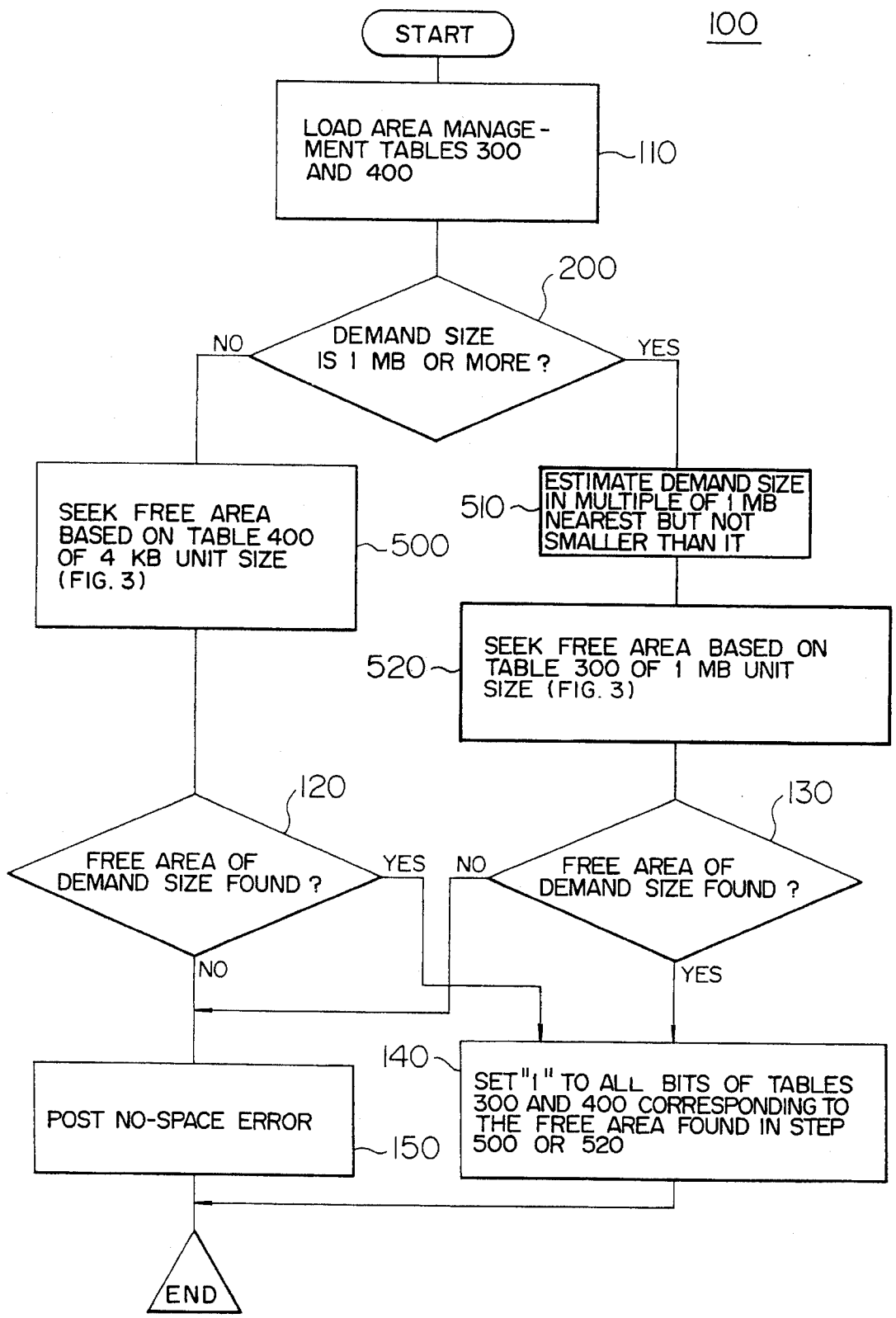

FIG. 3 is a flowchart showing the bit map search process which is step 500 in the free area seek program;

FIG. 4 is a diagram showing the bit map table with a unit area size of 1 MB;

FIG. 5 is a diagram showing the bit map table with a unit area size of 4 kB;

FIG. 6 is a flowchart showing the bit map search process which is step 600 in the free area seek program; and FIG. 7 is a flowchart showing the process of the free area seek program based on the second embodiment of this invention;

DESCRIPTION OF THE PREFERRED EMBODIMENTS

Figure 1:
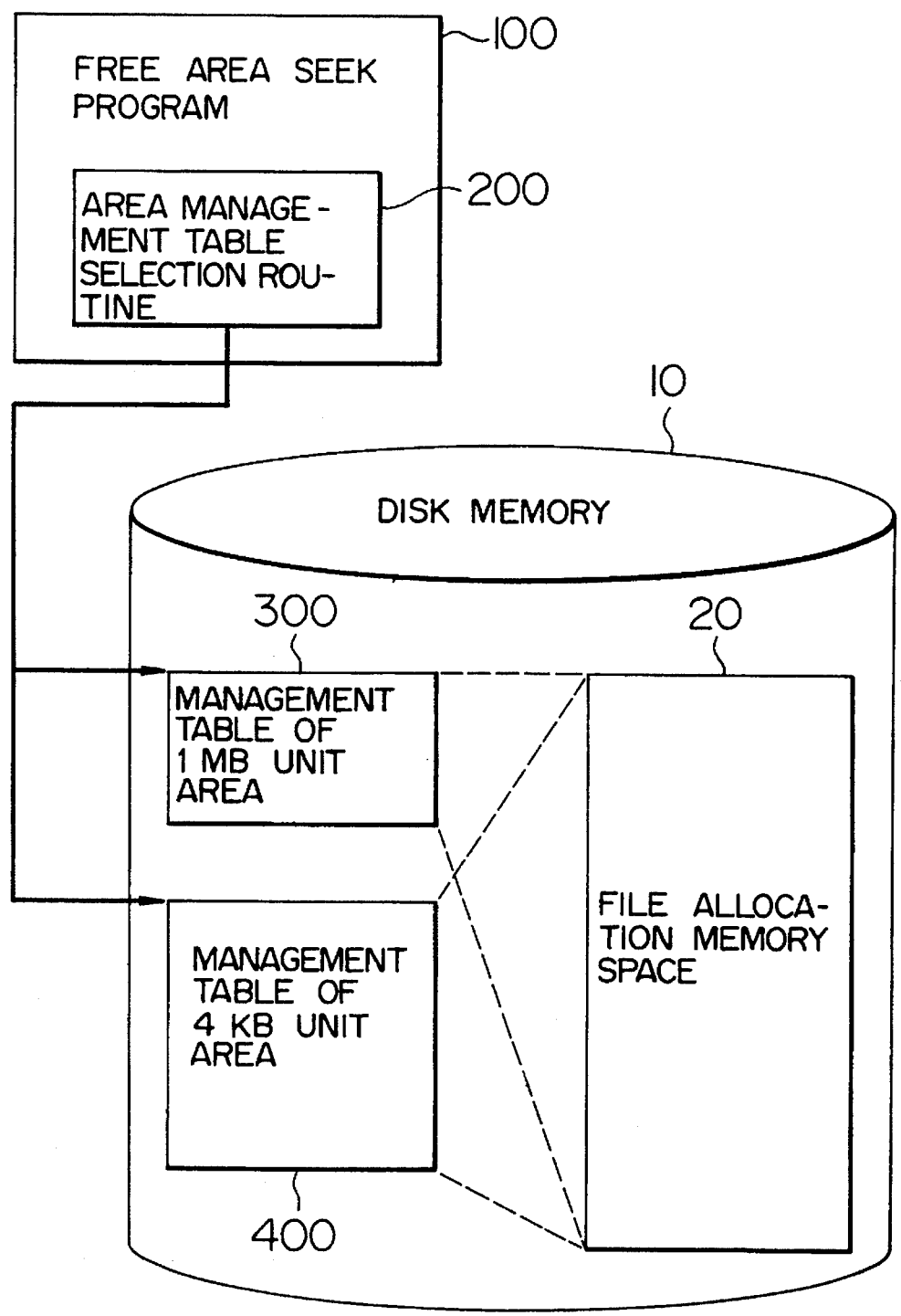
FIG. 1 is a diagram showing the memory space management system based on this invention.

An embodiment of this invention will be described with reference to the drawings. FIG. 1 shows the system organization based on this embodiment. The storage device concerned is a disk memory 10 and the area management tables include bit maps with two unit area sizes as follows.

(1) Area management table of 1 MB unit area size (300). This bit map has bits, each bit for a unit area of a size of 1 MB (mega-bytes); and
(2) Area management table of 4 kB unit area size (400). This bit map has bits, each bit for a unit area of a size of 4 kB (kilo-bytes). These sizes of 1 MB and 4 KB are merely example sizes. A unit area of 4 KB size represents a size of trucks within the disk memory 10, while a unit area of a 1 MB size represents a truck group comprised of successive trucks.

A feature of this invention is the provision of two area management tables 300 and 400 for the same disk memory 10, and these bit maps are used selectively by a free area seek program 100 which is run when an area in the disk memory 10 is to be allocated to a file. The program 100 includes a table selection routine 200 which selects one or both of the area management tables in seeking a free memory area.

Figure 2:
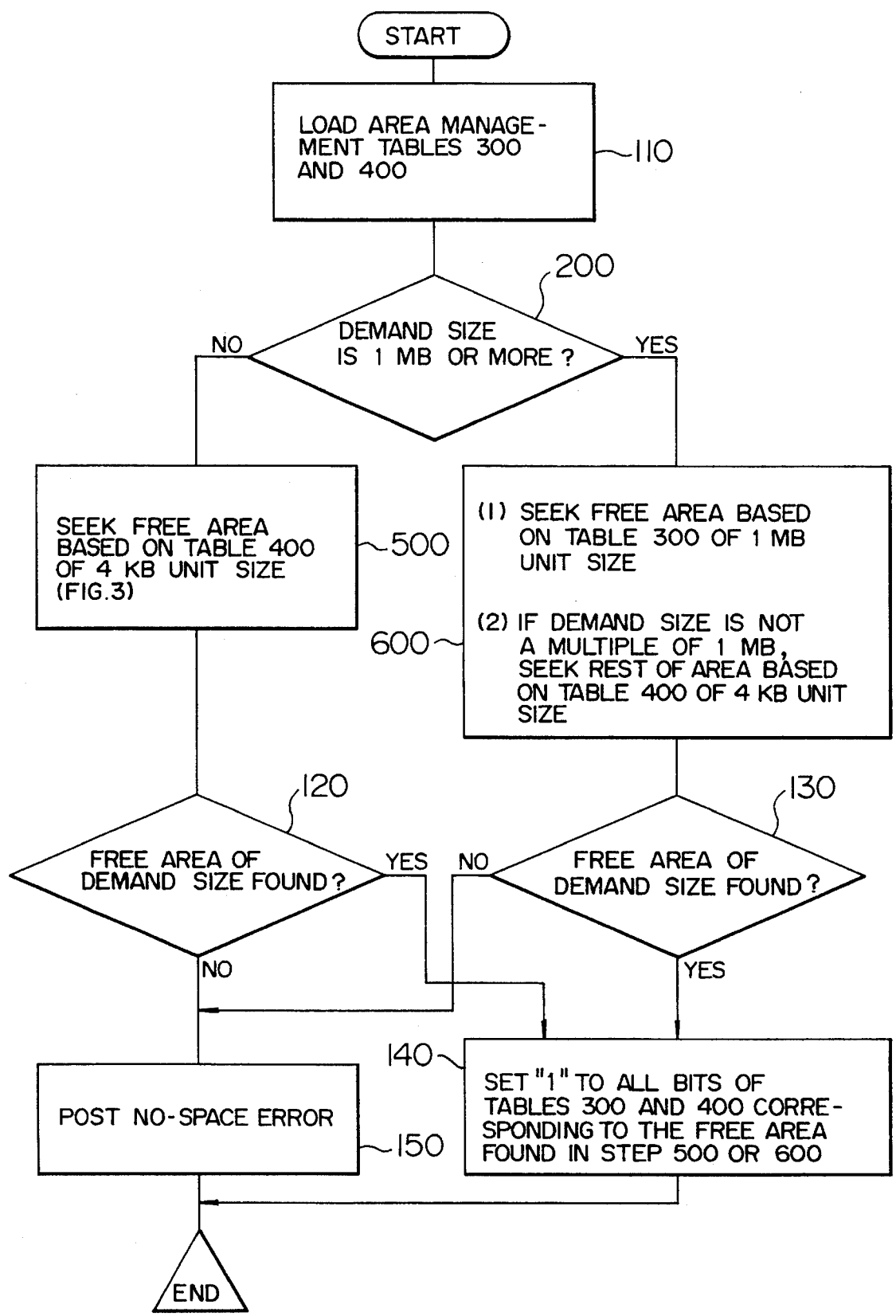
FIG. 2 is a flowchart showing the process of the free area seek program.

FIG. 2 shows the process of the free area seek program 100. Before entering into the explanation of the program, the structure of the area management tables 300 and 400 will further be explained with reference to FIG. 4 and FIG. 5.

The area management tables have a form of bit map, in which each bit in the table corresponds to a unit memory area, with each bit position directly representing the location of the area, and bit values of "0" and "1" signify the vacant and occupied states of the area. The area management table 300 shown in FIG. 4 is designed to deal with a continuous memory area of 1 MB in correspondence with each bit. The upper stage of the table shows a bit pattern, and the lower stage shows the byte-wise location in the memory space, with each byte data consisting of eight bits. The area management table 400 shown in FIG. 5 is designed to deal with a continuous memory area of 4 kB in correspondence with each bit. The upper stage of each row of the table shows a bit pattern, and the lower stage shows the byte-wise location in the memory space.

Both tables deal with the same memory space of the disk memory. Namely, the area management table 400 includes subdivisions of the area management table 300. Specifically, one row (32 bytes) of the table 400 corresponds to one bit of the table 300, and a block of eight rows (256 bytes) of the table 400 corresponds to one byte of the table 300. Bit value "0" for a memory area signifies the complete vacant state of the unit memory area, and bit value "1" signifies an occupied state of the memory in both tables 300 and 400. In case of the table 300, a partially occupied memory area is regarded as being in an occupied state.

Next, the process of the free area seek program 100 which is run to find a free area for allocating a file based on the above-mentioned area management tables will be explained along the flowchart of FIG. 2.

The free area seek program 100 is initiated, with the capacity of a free area to be found (will be termed "requested size" hereinafter) being specified as a user's parameter. In the first step 110, the area management tables 300 and 400 are read out of the disk memory 10 and loaded into the main memory (not shown). In step 200, the requested size is compared with the unit area sizes of the area management tables to thereby select a table having a unit area size nearest to the requested size but not larger than it. Specifically, the requested size is first compared with 1 MB of the table 300. If the requested size is 1 MB or larger, this table is selected for the introduction to a hierarchical seek (step 600 in FIG. 2), or otherwise the table 400 is selected for a one level seek (step 500 in FIG. 2). The process branches to step 600 if the requested size is 1 MB or more, or to step 500 if the requested size is less than 1 MB.

The process of step 500 will be explained first. Assuming that the requested size for file allocation is 40 kB, step 500 searches for ten continuous "0" bits in the area management table 400 shown in FIG. 5. The process of step 500 will be explained on the detailed flowchart of FIG. 3. In the first step 700, the search start location is set in the SADDR. The search start location is defined in terms of the relative address in the table 400. Specifically, byte 0 which is the head position of the table as shown in FIG. 5 is set. The next step 710 clears a variable COUNT which counts continuous "0" bits, and clears a variable TOP which indicates the bit position in the leading byte address corresponding to the continuous "0" bits. The next step 720 loads 1-byte data in the area management table 400 indicated by a variable SADDR into a variable WORK and step 730 compares the data with hexadecimal value FF to thereby to test whether or not all bits of the data are "1", i.e., whether or not all unit areas corresponding to all bits of the byte data are already used. If the step reveals WORK=FF, indicative of occupied areas, step 740 clears the COUNT and step 750 increments the SADDR by one so that the process from step 720 is repeated for the successive bytes in the area management table 400. Control of loop operation and error check are not shown in FIG. 3. During the loop operation starting with step 720, bit "0" is encountered when SADDR=32, causing the step 730 to make a negative judgement, and the process branches to step 760 so that bit-wise search for the byte is carried out.

In this process, step 760 first clears the loop counter (LOOP), step 770 makes the judgement of LOOP=8, and step 780 increments the LOOP counter by one, so that all bits of the byte are examined. Accordingly, the step 770 makes a negative judgement and step 780 increments the LOOP counter until the end of examination of all bits of the byte. The next step 790 shifts the data, which has been loaded into the variable WORK, by one bit to the left, and step 800 tests the polarity of the WORK. The step 800 tests the bit value to be "1" or "0" based on the fact that the WORK is negative if the leading bit of the WORK is "1" indicative of "occupancy", or it is positive if the leading bit is "0". For byte 32 in FIG. 5, the leftmost bit 0 has a value of "1", causing the step 800 to make a negative judgement, and the process branches to step 810. The step 810 temporarily sets the next bit position to the variable TOP which indicates the head position of consecutive "0" bits, and sets the byte position of the bit to the variable BADDR. The next step 820 clears the "0" bit counter COUNT (this counter is cleared unconditionally when "1" bit is encountered). The process from step 770 to step 820 is repeated for the byte 32 in the area management table 400 until the first "0" bit is encountered. Specifically, if LOOP=3 and TOP=2 as a result of the process for the bit 2, the step 800 makes a positive judgement, and the subsequent step 830 increments the variable COUNT by one. The next step 840 tests whether the size of free area indicated by the COUNT (the value of COUNT multiplied by 4 kB) meets the requested size. At this moment, the COUNT is 1 and it does not meet the requested size (4 kB, which corresponds to 10 bits in this example), and the step 840 makes a negative judgement, causing the process to return to step 770. Since there are consecutive "0" bits starting from bit 2 of the byte 32 in the area management table 400, the foregoing process of steps 770, 780, 790, 800, 830 and 840 are repeated up to the last bit of the byte 32. Then, it becomes TOP=2 and LOOP=8, and the step 770 make a positive judgement, causing the step 750 to increment the SADDR so that the foregoing process is next carried out for the byte 33 in the area management table 400. This process is described as follows. The byte 33 which has been loaded into the variable WORK in step 720 is treated by steps 730 and 760, and then processed by steps 770, 780, 790,800, 830 and 840, with the counter COUNT being incremented by one at each repetition. After bit 3 of the byte 33 has been processed, the COUNT value becomes 10, causing the step 840 to make a positive judgement, and a free area of the described size is now found. This free area corresponds to the bits starting at the bit position indicated by TOP, with the number of bits being indicated by COUNT, which belong to the byte indicated by BADDR in the area management table 400, as shown as step 850 in the flowchart. The free area seek process based on the area management table 400 of 4 kB unit area size (step 500 in FIG. 2) is now completed, and the operation proceeds to step 120 of FIG. 2. The step 120 judges whether or not a free memory area of the requested size has been found in the preceding process, and if it is negated the next step 150 posts a "no space" error and terminates the process. If the step 120 confirms the assignment of a proper area, the next step 140 sets "1" to the bits pertinent to the area in the area management tables 300 and 400, and terminates the process. The bit positions to be set "1" are given by the variables BADDR, TOP and COUNT. In case a free area is found in a 1 MB area which is already used in part, as in the case of this example, the bit in the table 300 for that area is already "1" and it does not need to set the bit again. These are the processes for finding a free memory area smaller than 1 MB.

Next, the process for finding a free memory area of 1 MB or larger will be explained. This is the case of branching at step 200 to step 600 in the flowchart of FIG. 2. The step 600 first seeks a number of larger unit areas which are necessary to supply a requested size, based on the area management table 300 and thereafter further seeks a number of smaller unit areas which are necessary to supply a remaining area, based on the table 400. On completion of seeking by the step 600, it is tested by step 130 as to whether a free memory area which meets the requested size has been found, and the process terminates after step 140 sets "1" to the bits pertinent to the area in the area management tables 300 and 400.

The process of step 600 will be explained in more detail on the flowchart of FIG. 6 by taking an example of seeking a free area of 2056 kB (i.e. 2×1 MB +2×4 kB). The first step 910 sets the requested size, with its part below 1 MB being truncated, i.e., an area size in terms of the number of bits of the area management table 300, to a variable C1, and sets the requested size, with its part below 1 MB being counted as 1 MB, to a variable C2. Namely, value 2 is set to C1 and value 3 is set to C2 for the requested area size of 2 MB plus 8 kB of this example. Subsequently, step 900 is carried out based on the area management table 300, in the same manner as explained on FIG. 3. In the process of step 900, the steps (770, 780, 790, 800, 810 and 820) are repeated until the operation reaches bit 0 of byte 1 (during the process of byte 0) in the table 300. Subsequently, the process goes out of the step 900 and comes to a judgement step 920. The variable COUNT is 1 at this time, causing the step 920 and successive step 930 to make a negative judgement, and the next bit (bit 1) of the byte 1 is processed by the step 900. Following the repetitive process, when the operation reaches bit 1 of byte 1 in the table 300, the COUNT becomes 2 (BADDR=1, TOP=0), causing the step 920 to direct the process to step 960. The step 960 judges whether or not the value of C1 is equal to the requested size, i.e., whether the requested size is a multiple of 1 MB. This condition is negated in this example. Through the foregoing process, a free area of 2 MB (COUNT=2) is found as a candidate, and the process proceeds to step 965 for seeking a free area of 8 kB which is contiguous to the 2 MB candidate free area based on the area management table 400 of 4 kB unit area size. Initially, the step 965 seeks a free area which is contiguous to the front of the 2 MB candidate area as follows. The byte position of this front-adjoining area in the table 400 is detected from the variables BADDR and TOP which indicate the head position of the candidate free area in the table 300. The byte position of the table 400 is evaluated by multiplying BADDR by eight and added by TOP and the result is multiplied by 32 and subtracted by one. Specifically, the byte position of the table 400 is determined to be 255, as shown in FIG. 5, as a result of calculation (1×8+0)×32−1. The step 965 counts consecutive "0" bits from the right end to the left of the byte 255, and detects an area of 4 kB. Then, a free area of 2 MB plus 4 kB is now found as a candidate free area. The next step 970 judges whether or not this candidate area meets the requested size 2056 kB (i.e. 2×1 MB+2×4 kB). This condition is negated, and the process branches to step 975 for seeking a free area which is contiguous to the end of the 2 MB candidate area. The step 975 calculates the byte position in the table 400 by multiplying BADDR by eight and added by TOP and COUNT and the result is multiplied by 32. Specifically, the byte position of the table 400 is determined to be 320, as shown in FIG. 5, as a result of calculation (1×8+0+2)×32. The step 975 counts consecutive "0" bits from the left end to the right of the byte 320, and detects an area of 4 kB. Then, a free area of 2 MB plus 4 kB plus 4 kB is now found. The next step 980 confirms that this free area meets the requested size, and the seek process is completed. The free area found in the foregoing process consists of a 2 MB area starting at the bit position indicated by TOP of the byte indicated by BADDR in the area management table 300 and two 4 kB areas which are contiguous to the front and end of the 2 MB area, as shown by step 985 in FIG. 6.

According to this embodiment, in which area management tables of 1 MB and 4 kB unit area sizes are provided so that a large area of 1 MB or more is sought based on the 1 MB table, and consequently the number of bits to be searched is reduced to approximately $1/256$ as compared with the case of solely using a table of 4 kB unit area size, whereby the CPU overhead for scanning the memory management table can be reduced accordingly. Moreover, the method of this embodiment does not incur a degraded space efficiency even in seeking a small free area owing to the combinational use of the table of 4 kB unit area size.

The second embodiment of this invention will be described with reference to FIG. 7. This embodiment is intended for a disk memory 10, with two area management tables 300 and 400 of different unit area sizes being provided, as in the case of the preceding first embodiment. The only difference of this embodiment from the first embodiment is the process of the free area seek program 100 shown in FIG. 7. The different portions are steps 510 and 520 enclosed in bold blocks in the flowchart of FIG. 7, with remaining portions identical to those of the preceding embodiment shown in FIG. 2 being referred to by the common step numbers.

The free area seek operation is initiated, with the capacity of free area required (requested size) being specified, as in the first embodiment. After the first step 110 has been done in the same manner as the first embodiment, the next step 200 selects an area management table depending on the requested size, as in the first embodiment. The process of step 500 which is the case of selection of the table 400 is identical to the first embodiment and the explanation will not be repeated, and the following explains the case of selection of another area management table 300. Step 510 estimates the requested size as a multiple of 1 MB which is nearest but not smaller than the accurate value for the area management table 300, and the subsequent step 520 implements the free area seek process for this area size in the same manner as explained on FIG. 3. The process of step 130 and successive steps is identical to the first embodiment and will not be repeated. In this manner, a large free area is sought based on the area management table of larger unit area size, while a small free area is sought based on the table of smaller unit area size, whereby free memory areas can be found efficiently as in the first embodiment. The seek operation of the second embodiment can result in an excessive assignment of area within the larger unit area size. This problem can be overcome by modifying the condition of comparison of the requested size with the unit area size of the area management table in step 200.

According to this invention, several area management tables of different unit area sizes are provided and used selectively depending on the demand size, and the following effectiveness can be accomplished.

(1) A large free area can be assigned efficiently by using the area management table of larger unit area size;

(2) A small free area can be assigned efficiently by using the area management table of smaller unit area size; and (3) Hierarchical seek operation, i.e., first based on the table of larger unit area size and next based on the table of smaller unit area size, is possible, and free areas of various sizes can be assigned without the degradation of space efficiency.

Accordingly, by setting a large unit area size arbitrarily depending on the capacity of the storage device, it is possible to suppress the overhead of command execution for the free area seek operation, which would increase in proportion to the storage capacity in the conventional method, and yet the degradation of space efficiency in assigning small free areas can be relieved.

Many different embodiments of the present invention may be constructed without departing from the spirit and scope of the invention. It should be understood that the present invention is not limited to the specific embodiments described in this specification. To the contrary, the present invention is intended to cover various modifications and equivalent arrangements included within the spirit and scope

What is claimed is:

1. A computer-implemented method of searching for a non-allocated portion of an area within a storage device, said method comprising the steps of:

(a) storing an allocation state of the area in terms of a plurality of allocation state information, each of the allocation state information corresponding to one of a plurality of different division sizes, the allocation state information for each division size indicating allocation states of a group of unit areas corresponding to respective division sizes as to whether or not each of the group of unit areas of respective division sizes is an allocated area, a total number of the unit areas of each group being indicated by the respective division sizes;

(b) selecting one of the division sizes in response to a search request for a non-allocated area of a variable amount of area, the selected division size being one which is a maximum among one division size or a plurality of the different sizes which are less than the required amount of area;

(c) searching said allocation state information for at least one non-allocated unit area, as necessary, so long as a total amount of area of the at least one searched non-allocated unit areas does not exceed the required amount of area, from a same group of unit areas corresponding to the selected division size, based upon the allocation state information for the selected division size; and (d) searching said allocation state information for at least one non-allocated unit area which is necessary to satisfy the difference between the required amount of area and a total amount of area of the at least one selected non-allocated areas, from another group of unit areas corresponding to another division size which is a maximum of at least one division size smaller than the selected division size, if there is any, based upon each bit of the allocation state information for the another division size.

2. A method for search according to claim 1, further comprising the steps of:

(e) changing allocation status information for the selected division size, so that the information indicates that the at least one unit area searched in step (c) is in an allocated state;

(f) changing allocation status information for each of at least one division size which is smaller than the selected division size, if there is any, so that the allocation status information indicates that part of a group of unit areas corresponding to said each division size is in an allocated state, the part of the group of unit areas comprising unit areas included in the at least one unit area searched in step (c);

(g) changing allocation status information for the another division size, so that the information indicates that the at least one unit area searched in step (d) is in an allocated state; and (h) changing allocation status information for each of at least one division size which is larger that the another division size, so that the allocation status information indicates that part of a group of unit areas corresponding to said each division size are in an allocated state, the part of the group of unit areas comprising unit areas each of which includes one of the at least one unit area searched in step (d).

3. A method for searching according to claim 1, wherein the allocation state information for each division size is stored in a form of an area management table which includes plural bits, each bit corresponding to one of a group of unit areas corresponding to said each division size and each bit indicating whether or not a corresponding unit area is in a state already allocated;

wherein step (c) includes the step of searching the at least one non-allocated unit area, by scanning the area management table stored for the selected area division size; and wherein step (d) includes the step of searching the at least one non-allocated unit area, by scanning the area management table stored for the another division size.

4. A method for searching according to claim 1, wherein the step (c) comprises the step of searching at least one non-allocated unit area which has successive addresses, so that a total amount of area of the at least one searched non-allocated areas doe not exceed the required amount of area from the same group; and wherein step (d) comprises the step of search at least one non-allocated unit area which has successive addresses and which is necessary to satisfy a difference between the required amount and the amount of the at least one selected non-allocated area, from the another group.

5. A method for searching according to claim 4, further comprising the steps of:

(e) changing allocation status information for the selected division size, so that the information indicates that the at least one unit area searched in step (c) is in an allocated state;

(f) changing allocation status information for each of at least one division size which is smaller than the selected division size, if there is any, so that the allocation status information indicates that part of a group of unit areas corresponding to said each division size is in an allocated state, the part of the group of unit areas comprising unit areas included in one of the at least one unit area searched in step (c);

(g) changing allocation status information for the another division size, so that the information indicates that the at least one unit area searched in step (d) is in an allocated state; and (h) changing allocation status information for each of at least one division size which is larger than the another division size, so that the allocation status information indicates that part of a group of unit areas corresponding to said each division size is in an allocated state, the part of the group of unit areas comprising unit areas each of which includes one of the at least one unit area searched in step (d).

6. A method for searching according to claim 4, wherein the allocation state information for each division size is stored in a form of an area management table which includes plural bits, each bit corresponding to one of a group of unit areas corresponding to said each division size and each bit indicating whether or not a corresponding unit area is in a state already allocated;

wherein step (c) includes the step of searching the at least one non-allocated unit area, by scanning the area management table stored for the selected area division size; and wherein step (d) includes the step of searching the at least one non-allocated unit area, by scanning the area management table stored for the another division size.

7. A method according to claim 1 wherein step (c) comprises the sub-step of:

(c1) searching plural non-allocated unit areas of the selected division size having successive addresses, in case plural non-allocated unit areas of the selected division size need to be searched; and wherein step (d) comprises the sub-step of:

(d2) searching plural non-allocated unit areas of the another division size, having successive addresses and located at either ones of succeeding addresses and preceding addresses to addresses of the searched plural non-allocated unit areas of the selected size.

8. A method according to claim 7, wherein the step (d1) comprises the sub-steps of:

(d1-1) searching a first group of plural non-allocated unit areas of the another division size, having successive addresses and located at either ones of succeeding addressed and preceding addresses to addresses of the searched plural non-allocated unit areas of the selected size, so as to satisfy the difference: and (d1-2) searching a second group of plural non-allocated unit areas of the another division size, having successive addresses and located at other one of succeeding addresses and preceding addresses to addresses of the searched plural non-allocated unit areas of the selected size, in case a total amount of area of the first group of plural non-allocated unit areas searched as a result of step (d1-1) is not enough to satisfy the difference.

9. A method according to claim 7, further comprising the sub-steps of:

(c2) repeating steps (c1) and (d1) for another location of the area of the storage device, in case a total amount of area of plural non-allocated unit areas of the another size required to satisfy the difference has not been searched as a result of step (d1).

10. A computer-implemented method of searching for a non-allocated portion of a storage device area, said method comprising the steps of:

(a) storing a plurality of allocation information for plural unit areas, each of said plurality of allocation information indicating each of a plurality of respective division sizes;

(b) selecting one of the respective division sizes in response to a search request for a non-allocated area of a variable size, the selected division size being one which is the largest amongst the respective division sizes without exceeding the variable non-allocated area size corresponding to the search request;

(c) searching said plurality of allocation information for a required amount of non-allocated unit areas of the selected division size so as to approach, but not exceed, the variable non-allocated area size corresponding to the search request; and (d) searching said plurality of allocation information for a required amount of non-allocated unit areas corresponding to division sizes smaller than the selected division size to satisfy the difference between the searched non-allocated unit areas of the selected division size and the variable non-allocated area size corresponding to the search request.

11. A searching method according to claim 10, further comprising the steps of:

(e) updating allocation status information to indicate that the non-allocated unit areas of the selected division size searched in step (c) are in an allocated state; and (f) updating allocation status information to indicate that the non-allocated unit areas corresponding to division sizes smaller than the selected division size searched in step (d) are in an allocated state.

12. A searching method according to claim 10, wherein the allocation state information for each division size is stored in a form of an area management table which includes plural bits, each bit corresponding to one of a group of unit areas corresponding to said each division size and each bit indicating whether or not a corresponding unit area is in an allocated state;

wherein step (c) includes the step of searching the non-allocated unit areas of the selected division size by scanning the area management table stored therefor; and wherein step (d) includes the step of searching the non-allocated unit areas corresponding to division sizes other than the selected division size by scanning the area management table stored therefor.

13. A searching method according to claim 10, wherein step (c) comprises the step of searching at least two non-allocated unit areas having successive addresses, so that a total amount of area of the searched non-allocated areas of the selected division size does not exceed the variable non-allocated area size corresponding to the search request; and wherein step (d) comprises the step of search at least two non-allocated unit areas having successive addresses and which are necessary to satisfy a difference between the variable non-allocated area size corresponding to the search request and the searched non-allocated areas of the selected division size.

* * * * *